US012631843B2

(12) United States Patent (10) Patent No.: US 12,631,843 B2
Vishnia et al. (45) Date of Patent: May 19, 2026

(54) SELF-ALIGNING ACTIVE RETROREFLECTOR SYSTEM AND METHOD

(71) Applicant: PLX, Inc., Deer Park, NY (US)

(72) Inventors: Itai Vishnia, Setauket, NY (US); Malcolm Humphrey, Hicksville, NY (US); Martin Rost, Islip Terrace, NY (US)

(73) Assignee: PLX, Inc., Deer Park, NY (US)

( * ) Notice: Subject to any disclaimer, the term of this patent is extended or adjusted under 35 U.S.C. 154(b) by 710 days.

(21) Appl. No.: 18/053,895

(22) Filed: Nov. 9, 2022

(65) Prior Publication Data

US 2023/0176313 A1 Jun. 8, 2023

Related U.S. Application Data

(60) Provisional application No. 63/264,810, filed on Dec. 2, 2021.

(51) Int. Cl.
  *G02B 7/00* (2021.01)
  *G02B 7/182* (2021.01)
(52) U.S. Cl.
  CPC ............. *G02B 7/008* (2013.01); *G02B 7/182* (2013.01)
(58) Field of Classification Search
  CPC ............ G02B 7/008; G02B 7/181–182; G02B 7/1827
  See application file for complete search history.

(56) References Cited

U.S. PATENT DOCUMENTS

| 5,446,546 A | 8/1995 | Breidenbach et al. |
| 6,215,230 B1 | 4/2001 | Ide et al. |
| 7,016,594 B1 | 3/2006 | Godil et al. |
| (Continued) | | |

FOREIGN PATENT DOCUMENTS

| CN | 107783249 A | 3/2018 | |
| JP | 5092494 B2 | 12/2012 | |
| WO | WO-2021160712 A2 * | 8/2021 | ......... G03F 7/70266 |

OTHER PUBLICATIONS

Raba, English translation for WO-2021160712-A2 (Year: 2021).*
(Continued)

*Primary Examiner* — Jonathan Y Jung
(74) *Attorney, Agent, or Firm* — ICE MILLER LLP; Safet Metjahic

(57) ABSTRACT

An apparatus, system, and computer-implemented method that correct for thermal drift in one or more optical elements in an optical device and maintain high precision accuracy of the optical device during extreme temperature changes. The apparatus includes an optical device having an optical element configured to direct or reflect a light beam, a pivot support configured to hold a portion of the optical element and facilitate motion of the optical element in multidimensional space, a controller configured to determine a displacement of the optical element due to thermal drift and generate an actuator drive signal based on the amount of the displacement, and an actuator configured to receive the actuator drive signal and counteract the thermal drift by moving, in cooperation with the pivot support and in response to the actuator drive signal, the optical element by an inverse amount and direction of the displacement of the optical element.

20 Claims, 7 Drawing Sheets

1

(56) References Cited

U.S. PATENT DOCUMENTS

| | | | | |
|---|---|---|---|---|
| 7,358,516 | B2 | 4/2008 | Holler et al. | |
| 10,409,379 | B1 | 9/2019 | Khoshkava et al. | |
| 11,070,718 | B2 | 7/2021 | Barton et al. | |
| 2004/0223717 | A1* | 11/2004 | Romo | G02B 6/266 |
| | | | | 385/140 |
| 2009/0027753 | A1 | 1/2009 | Lizotte | |
| 2010/0177414 | A1* | 7/2010 | Devilliers | G02B 7/1815 |
| | | | | 359/846 |
| 2010/0282941 | A1* | 11/2010 | Mosier | G01S 17/66 |
| | | | | 250/203.1 |
| 2013/0136390 | A9* | 5/2013 | McGinnis | G02B 6/12026 |
| | | | | 385/14 |
| 2014/0285880 | A1* | 9/2014 | Southard | B29D 11/00596 |
| | | | | 359/872 |
| 2014/0340750 | A1 | 11/2014 | Neal et al. | |
| 2015/0043055 | A1 | 2/2015 | Yang et al. | |
| 2017/0322077 | A1 | 11/2017 | Bohle et al. | |

OTHER PUBLICATIONS

International Preliminary Report on Patentability issued in PCT/US2022/079550, dated May 2, 2024.

International Search Report and Written Opinion issued in PCT/US2022/079550, mailed on Jan. 31, 2023.

Supplementary European Search Report issued in EP 22 90 2307, dated Nov. 7, 2025.

* cited by examiner

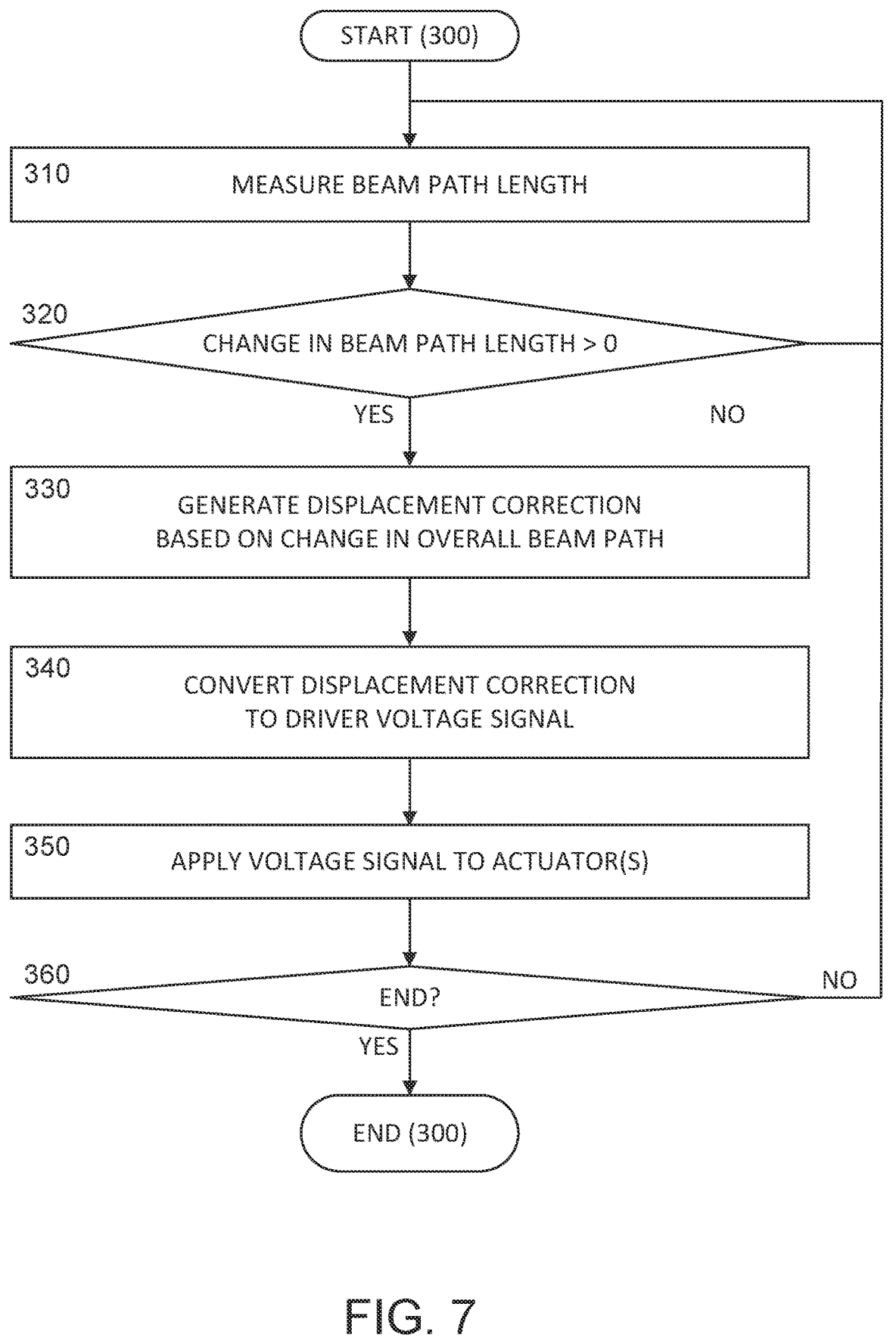

START (300)

310  MEASURE BEAM PATH LENGTH

320  CHANGE IN BEAM PATH LENGTH > 0

YES          NO

330  GENERATE DISPLACEMENT CORRECTION
BASED ON CHANGE IN OVERALL BEAM PATH

340  CONVERT DISPLACEMENT CORRECTION
TO DRIVER VOLTAGE SIGNAL

350  APPLY VOLTAGE SIGNAL TO ACTUATOR(S)

360  END?                                    NO

YES

END (300)

FIG. 7

SELF-ALIGNING ACTIVE RETROREFLECTOR SYSTEM AND METHOD

CROSS-REFERENCE TO RELATED APPLICATION

This application claims priority to and the benefit of provisional U.S. patent application No. 63/264,810, titled "Self-Aligning Active Retroreflector," filed Dec. 2, 2021, which is hereby incorporated herein by this reference in its entirety.

FIELD OF THE DISCLOSURE

The present disclosure relates generally to optics, electronics, electronic firmware, laser technology and computing resources for improving accuracy of optical elements within an optical device such as, for example, a retroreflector, a hollow retroreflector, lateral transfer hollow retroreflector (LTHR), or lateral transfer hollow periscope (LTHP), or any arbitrary optical element within an optical system, or within a Monolithic Optical Structure Technology™ (M.O.S.T) assembly,

BACKGROUND OF THE DISCLOSURE

Applications such as boresighting, beam alignment, beam delivery, and beam reception require a critical alignment of one optical axis or line of sight with another. In these applications, the beams must be parallel to each other with a high degree of precision, in some cases better than one second of arc (arcsec). Often, this precision must be maintained in harsh environments, such as extreme temperatures and high vibration and shock. Alignment in these situations is traditionally accomplished with expensive optical mount setups that are inherently unstable and can change their accuracy at the time of alignment. This creates constant differences in readings and makes the process extremely difficult. In addition, optical mounts, such as, for example, mirror panel mounts, are usually made by using mechanical interface parts that are not considered stiff structures. Thus, they require constant calibration after vibration, shock or even regular use.

Devices such as, for example, retroreflectors, hollow retroreflectors, lateral transfer hollow retroreflectors (LTHRs), lateral transfer hollow periscopes (LTHPs), and M.O.S.T. assemblies can have structural designs that are resistant to extreme temperature variations or high vibration or shock.

SUMMARY OF THE DISCLOSURE

Although resistant to extreme temperature variations or high vibration or shock, such devices, however, are susceptible to alignment inaccuracies due to thermal variations that cause the materials in the optical elements in the devices to expand and contract and move in relation to each other. The instant disclosure provides a solution that remediates the alignment inaccuracies that can be caused by the expansion or contraction of materials in the optical elements. The solution includes an apparatus, system, and computer-implemented method for remediating such alignment inaccuracies.

An embodiment of the disclosure includes an apparatus that corrects for thermal drift in one or more optical elements in an optical device and maintains high precision accuracy of the optical device during extreme temperature changes. The apparatus comprises: an optical device having an optical element configured to direct or reflect a light beam; a pivot support configured to hold a portion of the optical element and facilitate motion of the optical element in multidimensional space; a controller configured to determine a displacement of the optical element due to thermal drift and generate an actuator drive signal based on the amount of the displacement; and an actuator configured to receive the actuator drive signal and counteract the thermal drift by moving, in cooperation with the pivot support and in response to the actuator drive signal, the optical element by an inverse amount and direction of the displacement of the optical element.

The apparatus can comprise a beam calibrator configured to detect the displacement of the optical element due to thermal drift and generate a beam displacement signal representative of an amount of the displacement of the optical element due to thermal drift. The controller can be configured to: receive the beam displacement signal from the beam calibrator; and determine the displacement of the optical element based on the beam displacement signal.

The apparatus can comprise a calibration table having displacement versus temperature data for the optical element, wherein the controller determines the displacement of the optical element due to thermal drift by referencing the calibration table and determining the displacement of the optical element based on a measured temperature.

The apparatus can comprise a temperature sensor that measures a temperature on the optical element.

The optical element can comprise a mirror panel and the optical device comprises at least one of a lateral transfer hollow retroreflector (LTHR), a lateral transfer hollow periscope (LTHP), one or more mirror panels, or a retroreflector having three mirror panels, including said optical element, with each mirror panel being separated from each other mirror panel to avoid crosstalk under changing temperatures.

The optical device can comprise a retroreflector having three mirror panels, including said optical element, and the beam calibrator detects the displacement of the optical element due to thermal drift by measuring an overall optical path length change between a beam hitting front faces of all three mirror panels.

The optical device can comprise a retroreflector having three mirror panels, including said optical element, and the beam calibrator comprises three interferometers, each configured to detect a tilt or a displacement of one of the three mirror panels.

The actuator can comprise a thermoelectric actuator or an electro-mechanical actuator.

The electro-mechanical actuator can comprise a piezo actuator having a piezo stack of piezo layers.

The electro-mechanical actuator can be preloaded to a compression state that allows for bidirectional operation, including expansion or contraction based on an applied voltage.

An embodiment of the disclosure comprises a computer-implemented method that, when executed by one or more processors, corrects for thermal drift in one or more optical elements in an optical device and maintains high precision accuracy of the optical device during extreme temperature variations. The method comprises: receiving a light beam from an optical element in an optical device; determining a displacement of the optical element due to thermal drift; generating an actuator drive signal based on the amount of the displacement of the optical element due to thermal drift;

and operating an actuator based on the actuator drive signal to counteract and move, in cooperation with a pivot support, the optical element by an inverse amount and direction of the displacement of the optical element.

The computer-implemented method can comprise: detecting the displacement of the optical element due to thermal drift by measuring an optical beam path change of the light beam from the optical element; and generating a beam displacement signal representative of an amount of the displacement of the optical element due to thermal drift.

The determining the displacement of the optical element due to thermal drift can be based on the beam displacement signal.

The determining the displacement of the optical element due to thermal drift can comprise: referencing displacement versus temperature values in a calibration table for the optical element; and, determining a displacement value based on a measured temperature.

In the computer-implemented method, the optical device can comprise a retroreflector having three mirror panels, including said optical element, and the measuring the optical beam path change of the light beam from the optical element comprises measuring an overall optical path length change between a beam hitting front faces of all three mirror panels.

In the computer-implemented method, the optical device can comprise a retroreflector having three mirror panels, including said optical element, and the measuring the optical beam path change of the light beam from the optical element comprises measuring an optical path length at each of the three mirror panels by a respective beam calibrator configured to detect a tilt or a displacement of the mirror panel.

In the computer-implemented method, the actuator can comprise an electro-mechanical actuator having a piezo stack of piezo layers. The electro-mechanical actuator can be preloaded to a compression state that allows for bidirectional operation, including expansion or contraction based on an applied voltage.

An embodiment of the disclosure comprises a non-transitory computer readable medium containing computer instruction or computer code that, when executed by one or more processors, cause an apparatus to perform operations to correct for thermal drift in one or more optical elements in an optical device and maintain high precision accuracy of the optical device during extreme temperature variations, including operations comprising: receiving a light beam from an optical element in an optical device; determining a displacement of the optical element due to thermal drift; generating an actuator drive signal based on the amount of the displacement of the optical element due to thermal drift; and operating an actuator based on the actuator drive signal to counteract and move, in cooperation with a pivot support, the optical element by an inverse amount and direction of the displacement of the optical element.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 7 shows a calibration process for the OSA apparatus in the closed-loop system.

Figure 1:
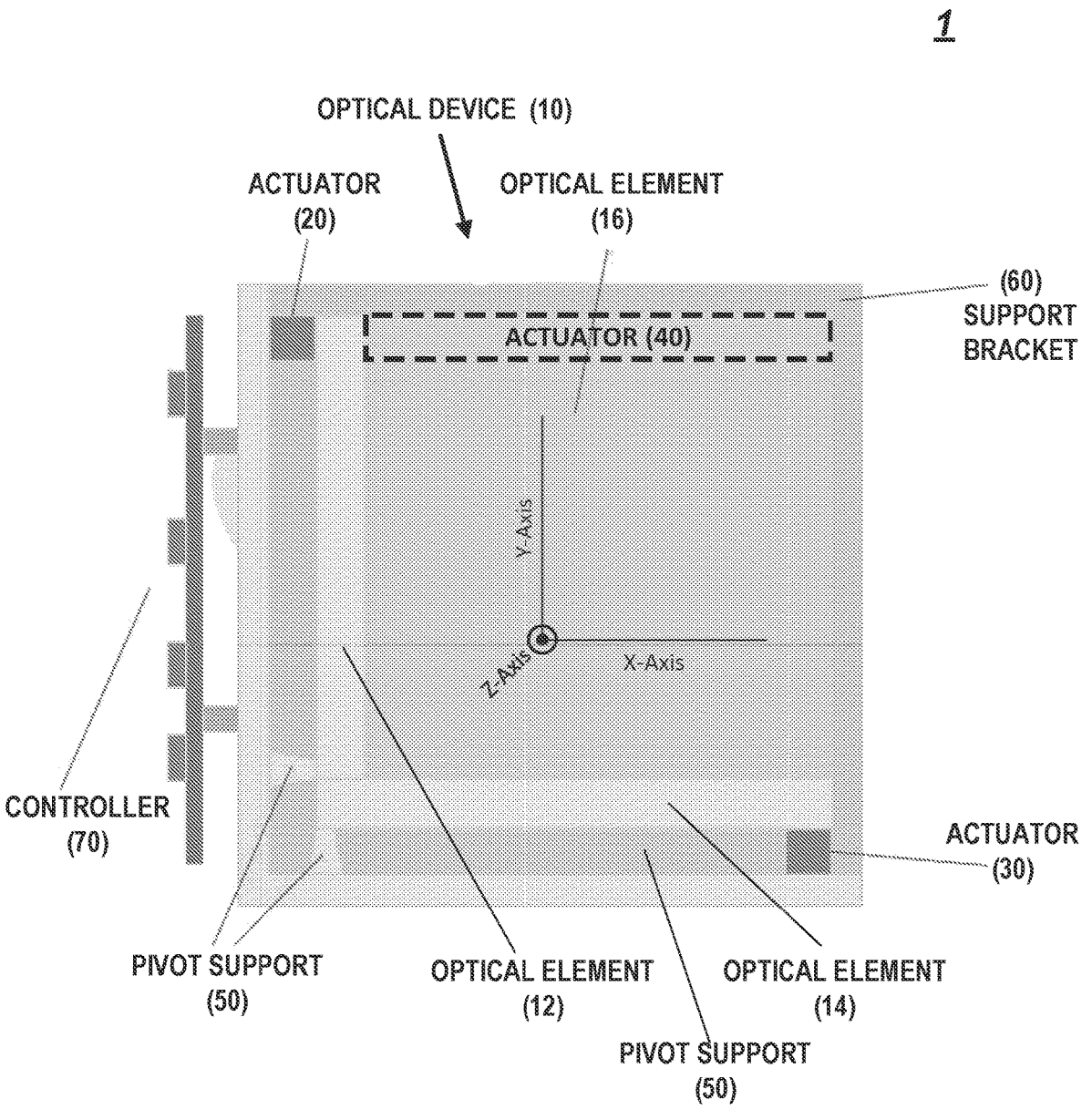
FIG. 1 shows an embodiment of an optical self-alignment (OSA) apparatus, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Optical systems such as, for example, hollow retroreflectors, LTHRs, LTHPs, M.O.S.T assemblies, and their components, operate in diverse and varying temperature environments that can vary from, for example, below −50 degrees Fahrenheit (F) to above 140 degrees F. For instance, Enhanced Combat Optical Sights (ECOS) used on military jet aircraft can experience large temperature changes, ranging from, for example, 130 degrees F. near ground level at some of the hottest places on earth to −70 degrees F. when ascending to 30,000 feet, or higher, over a short period of time. With such large temperature changes, the optical elements in an optical system such as an ECOS system can succumb to thermal drift that can affect the accuracy of the optical sights and can render the system unreliable for extremely precise detection, sensing, or measurement.

The temperature changes can be much more drastic in space applications, where, for example, satellites can experience temperature changes from the earth's surface temperature at launch to near absolute zero temperature in space (for example, about −455 degrees F.).

In retroreflectors and LTHR/LTHP devices, the thermal drift caused by temperature variations can affect the accuracy of the input and output beams relative to each other. In devices such as interferometers, the thermal drift can degrade the signal to noise ratio (SNR) and performance of such devices.

The instant disclosure provides a solution that mitigates such mal-effects, and others. The solution includes an apparatus, system and computer-implemented method that are configured to compensate for changes in optical alignment due to thermal drift in optical elements and optical systems, as they occur in real-time. In various embodiments, the apparatus and system can include an optical device having one or more optical elements, one or more actuators, one or more pivot supports, one or more support brackets, and a controller.

In various embodiments, the optical device can include a lens, a mirror panel, a retroreflector, a hollow retroreflector, an LTHR device, an LTHP device, or an interferometer. The optical device can include any optical element or optical system that can be configured or operated to provide a high degree of precision in directing or reflecting a light beam, such as, for example, one arcsec performance or better when directing or reflecting a coherent light beam, such as, for example, a laser beam.

In various embodiments, the actuator can include an electro-mechanical (EM) actuator, a piezo-electric stack, an electrostatic actuator, an electromagnetic actuator, or a thermoelectric (TE) actuator. In an embodiment, the EM actuator can be configured to expand or contract in proportion to an applied voltage. In another embodiment, the TE actuator can be configured to expand or contract in proportion to an applied temperature.

In various embodiments, the pivot support can include a pivot support block.

Figure 3:
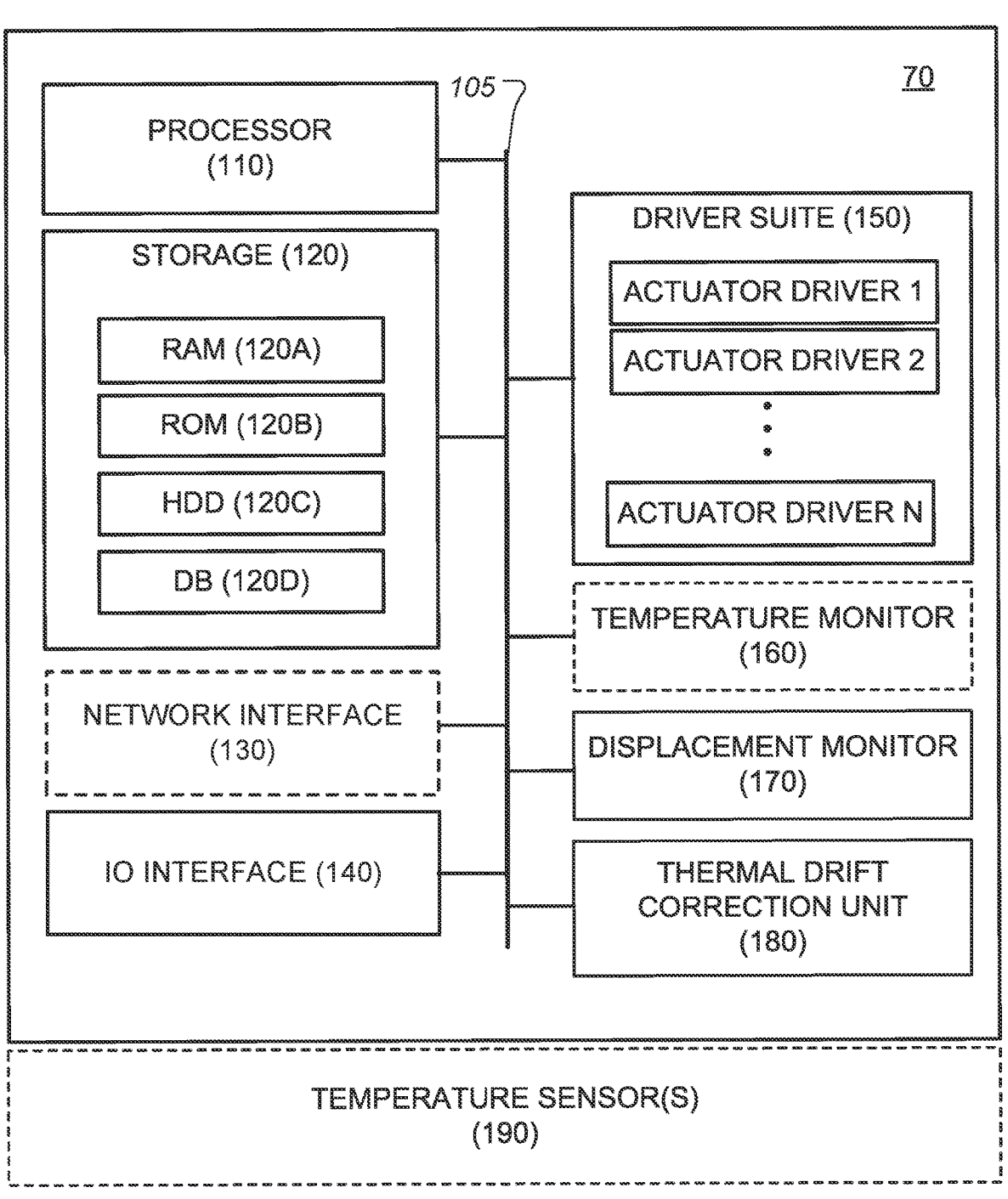
FIG. 3 shows an embodiment of a controller that can be included in the OSA apparatus.

In various embodiments, the controller can include a processor, a storage, an input-output (IO) interface, a communication link, and at least one driver. FIG. 3 depicts a nonlimiting embodiment of the controller.

FIG. 1 shows an embodiment of an optical self-aligning (OSA) apparatus 1, constructed according to the principles of the disclosure. The apparatus 1 includes an optical device 10, a plurality of actuators 20, 30, 40, a plurality of pivot supports 50, a support bracket 60, and a controller 70. In the depicted embodiment, the optical device 10 includes a retroreflector comprising three optical elements 12, 14, 16. The optical elements 12, 14, and 16 can each include, for example, a mirror panel.

Each of the actuators 20, 30, 40 can be configured to move a respective optical element 12, 14, 16 in the Cartesian coordinate system (x, y, z) along one or more axes, or in the spherical coordinate system (r, θ, φ), in conjunction with a corresponding pivot support 50. The actuator 40, which is not visible as it is hidden behind the optical element 16, is shown broken lines in FIG. 4. The z-axis is perpendicular to the drawing page. Each of the actuators 20, 30, 40 can be configured to operate cooperatively with a corresponding pivot support 50 to pivot the respective optical element 12, 14, 16 about its corresponding pivot support 50.

Each actuator 20, 30, and 40 can include a single actuator, or two or more discrete actuators operating in unison to move the corresponding optical element 12, 14, and 16, respectively, along any one or more of the x-, y-, and z-axis. The actuators 20, 30, 40 can have any three-dimensional (3D) shape, including, for example, a rectangular block, a cylindrical block, a pyramid, a semi-spherical block, or a spherical block.

Each actuator 20, 30, 40 can have a width that is sized to fit the width of the corresponding optical element 12, 14, 16.

In various embodiments, the actuators can be sized to have a width that is a portion of the width of the corresponding optical element, in which case a single actuator can be positioned, for example, centrally along the width of the optical element, or a plurality of actuators (for example, two or three) can be positioned along the width of the optical element.

Each actuator 20, 30, 40 can be bonded, adhered, or otherwise attached, to the corresponding optical element 12, 14, 16, respectively, and configured to push or pull the optical element based on the particular voltage (or temperature in certain embodiments) applied to corresponding actuator.

Each pivot support 50 can include a single support block, or two or more discrete support blocks. The pivot support 50 can have any 3D shape, including, for example, a longitudinal wedge, a pyramid, a semi-sphere, or a sphere, that can support the corresponding optical element as it pivots or turns about the pivot support.

Each pivot support 50 can be sized to fit the width of the corresponding optical element 12, 14, 16.

In various embodiments, each pivot support 50 can be sized to have a width that is a portion of the width of the corresponding optical element, in which case a single pivot support 50 can be positioned, for example, centrally along the width of the optical element, or a plurality of pivot supports 50 (for example, two or three) can be positioned along the width of the optical element and configured to operate in unison to support the optical element as it pivots.

In certain embodiments, each pivot support 50 can be configured to operate as a fulcrum for the corresponding optical element during adjustment.

Each optical element 12, 14, 16 can be bonded, adhered or otherwise attached along at least one edge to the support backet 60 such that the optical elements 12, 14, 16 are maintained orthogonal to each other at all times. Through operation of the actuators 20, 30, 40, the optical elements 12, 14, 16, in various embodiments, can be adjusted along three degrees of freedom (3DOF), while maintaining orthogonality to each other at all times.

Each optical element 12, 14, or 16 can be close to the adjacent optical element(s), but not touching, to eliminate crosstalk between the optical elements during thermal expansion or contraction. The optical elements 12, 14, and 16 can be configured in the optical device 10 such that a gap can is formed between edges of adjacent optical elements that is sufficient to prevent touching throughout the entire operating temperature range, from minimum temperature ($TEMP_{min}$) to maximum temperature ($TEMP_{max}$).

In at least one embodiment, the maximum operating temperature can include, for example, the highest recorded temperature on earth ($TEMP_{max}$=134 degrees F.); and, the minimum operating temperature can include, for example, the coldest temperature that the apparatus 1 is likely to experience during operation, such as, for example, −70 degrees F. for aircraft that can fly up to 65,000 feet ($TEMP_{min}$=−70 degrees F.), or about −455 degrees F. for spacecraft ($TEMP_{min}$=−455 degrees F.).

During operation, the actuators 20, 30, 40 can be driven by the controller 70 for active orientation correction of the optical elements 12, 14, 16 in the optical device 10 to correct for any thermal drift or alignment inaccuracy that might occur at any of the optical elements due to thermal variation. Each actuator 20, 30, 40 can be configured to change an angle of the respective optical element 12, 14, 16 by expanding or contracting, for example, along a longitudinal axis of the actuator, thereby moving the optical element in cooperation with the pivot support 50.

In various embodiments, the apparatus 1 can include one, two, three or more actuators for each optical element.

Figure 2:
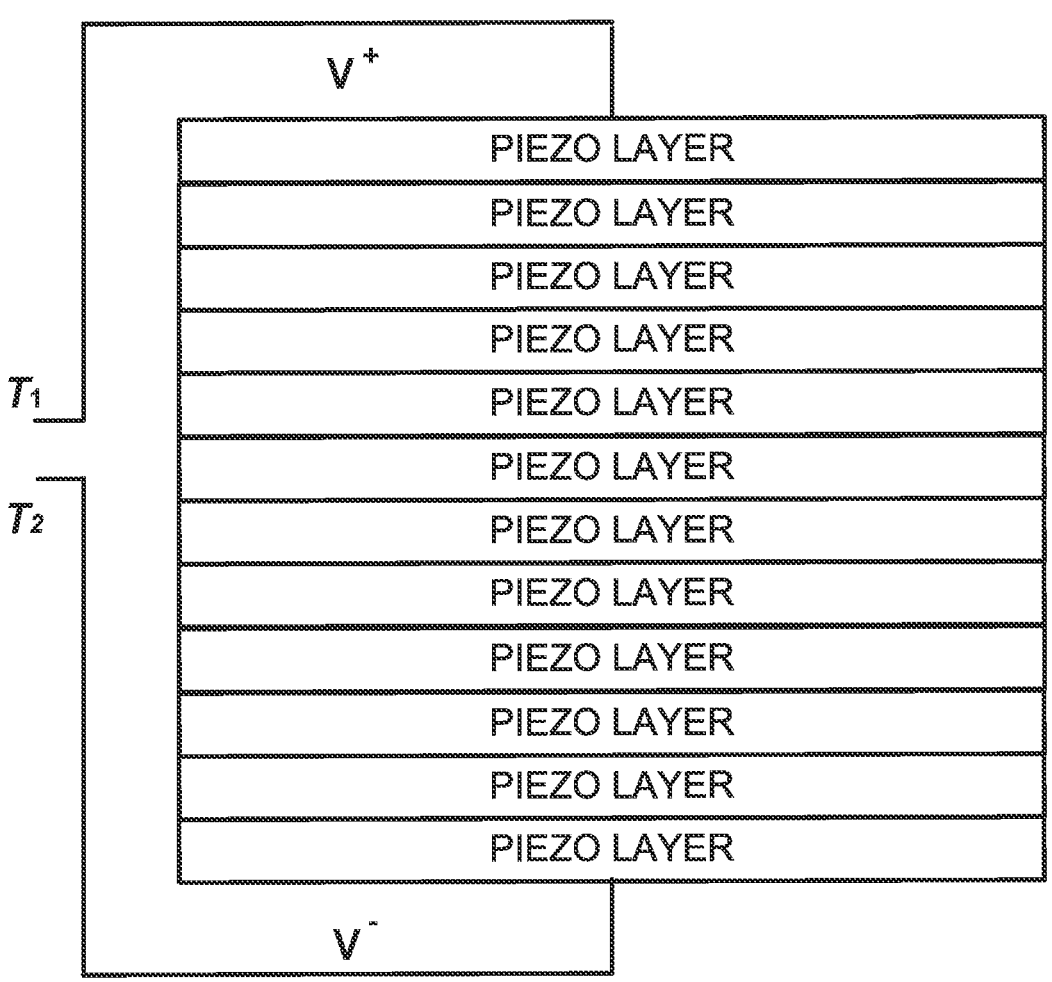
FIG. 2 shows an embodiment of an electro-mechanical actuator.

FIG. 2 shows an embodiment of an EM actuator that can be comprised in the OSA apparatus 1, such as, for example, in the actuators 20, 30, and 40 (shown in FIG. 1). In the depicted embodiment, the EM actuator is a piezo stack comprising a plurality of piezo-electric layers. The EM actuator can include a pair of terminals $T_1$ and $T_2$, which can be configured to supply a voltage $V^+$ and a voltage $V^-$ (for example, ground) to the piezo stack to operate the piezo layers to expand or contract in proportion to the applied voltage and move (push or pull) the associated optical element (for example, 12, 14, 16, shown in FIG. 1). In an embodiment, the terminal $T_1$ can be connected to the controller 70 and the terminal $T_2$ can be connected to ground or the controller 70. For example, the terminals $T_1$ and terminal $T_2$ can be connected to an actuator driver in the driver suite 150 (shown in FIG. 3).

The EM actuator can be configured to aggregate each piezo layer's expansion or contraction to create movement and force to move (for example, push or pull) an optical element in the optical device 10. Each individual piezo layer can have an alternating polarity compared to the adjoining piezo layer. An electrical field can be applied parallel to the direction of polarization and, when the voltage $V^+$ is applied, a displacement can be induced in each piezo layer in the direction of polarization. The movement of each piezo layer is equal to the voltage applied to the layer multiplied by a piezo coefficient for that piezo layer. The piezo coefficient relates to the efficiency of the piezo layer in transferring electrical energy to mechanical energy. The piezo layers can be stacked in series, in which case the total movement of the EM actuator, and resultantly the associated optical element, is the product of a movement amount of a single piezo layer times the total number of piezo layers in the stack, with each piezo layer having the same piezo coefficient. In other embodiments, the piezo layers can have different piezo coefficients. The EM actuator can be preloaded to a compression state that ensures the EM actuator can operate bidirectionally—that is, expand or contract based on the applied voltage V.

FIG. 3 shows a block diagram of an embodiment of the controller 70, constructed according to the principles of the disclosure. In various embodiments, the controller 70 can include an integrated circuit (IC) that can be included or integrated in the apparatus 1 as the controller 70. In the embodiment depicted in FIG. 3, the controller 70 includes a processor 110, a storage 120, an input-output (IO) interface 140, a driver suite 150, a displacement monitor 170, and a thermal drift correction unit (TDCU) 180. The controller 70 can include a network interface 130 and/or a temperature monitor 160. The controller 70 can include a temperature sensor 190 that is configured to measure the temperature on each optical element in the optical device 10. The controller 70 can include a bus 105, which can be connected to any or all of the components 110 to 190 in the controller by one or more communication links.

In various embodiments, the controller 70 can include a plurality of temperature sensors 190, each of which can be affixed to or positioned proximate to a corresponding, respective optical element in the optical device 10. For example, in the embodiment comprising optical elements 12, 14, 16, the temperature sensors 190 can include three separate temperature sensors, each configured to measure the temperature on one of the optical elements.

The controller 70 can include one or more computer resources that can be executed on the processor 110 as one or more processes. The computer resources can be contained in the storage 120. The controller 70 can be configured to implement the various aspects of the disclosed solution.

In various embodiments, the driver suite 150, optional temperature monitor 160, displacement monitor 170, and TDCU 180 can be implemented in the controller 70 as hardware, firmware, one or more computing resources, or any combination thereof. The In certain embodiments, any one or all of the components 150, 160, 170, and 180 can be configured as computing resources that are executable on the processor 110 as one or more processes.

The bus 105 can include any of several types of bus structures that can further interconnect to a memory bus (with or without a memory controller), a peripheral bus, and a local bus using any of a variety of commercially available bus architectures.

The processor 110 can include any of various commercially available processors, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture. The processor 110 can be arranged to interact with any of the components in the controller 70 to carry out or facilitate the processes included in, or described or contemplated by this disclosure.

The processor 110 can be arranged to run an operating system (OS), which can include an operating system (OS) kernel that can control all operations on the controller 70 and, more generally, the apparatus 1. The OS kernel can include, for example, a monolithic kernel or a microkernel. The OS kernel can be arranged to execute on the processor 110 and have control over operations in the processor 110.

The OS or OS kernel can be contained in the storage 120 and executed by the processor 110. The OS or OS kernel can be cached in the storage 120, such as, for example, in a random-access memory (RAM) 120A. The OS kernel can represent the highest level of privilege on the OS or the processor 110. In various embodiments, the OS can include a driver for each hardware device with which the processor 110 might interact, including the actuators—for example, actuators 20, 30, 40 (shown in FIG. 1). The OS kernel can be configured to allocate resources or services to, and enable computing resources or processes to share or exchange information, protect the resources or services of each computing resource or process from other computing resources or processes, or enable synchronization amongst the computing resources or processes.

The storage 120 can include the RAM 120A, a read-only memory (ROM) 120B, a hard disk drive (HDD) 120C, and/or a database (DB) 120D. The storage 120 can provide nonvolatile storage of data, data structures, and computer-executable instructions, and can accommodate the storage of any data in a suitable digital format. The storage 120 can include a non-transitory computer-readable medium that can hold the computer resources (including code or instructions) that can be executed (run) or interpreted by the operating system on the processor 110. The computer-readable medium can be contained in the HDD 120C. The computer readable medium can include a non-transitory computer readable medium comprising sections of computer code or instructions that, when executed by the processor 110, cause the various operations described in, or contemplated by, this disclosure to be performed.

A basic input-output system (BIOS) can be stored in the non-volatile memory ROM 120B, which can include, for example, a ROM, an erasable programmable read-only memory (EPROM), or an electrically erasable programmable read-only memory (EEPROM). The BIOS can contain the basic routines that help to transfer information between any one or more of the components in the controller 70, such as during start-up.

The RAM 120B can include dynamic random-access memory (DRAM), a synchronous dynamic random-access memory (SDRAM), a static random-access memory (SRAM), a non-volatile random-access memory (NVRAM), or another high-speed RAM for caching data.

The HDD 120C can include, for example, a solid-state drive, an enhanced integrated drive electronics (EIDE) drive, a serial advanced technology attachments (SATA) drive, or any suitable hard disk drive. The HDD can be configured for external use in a suitable chassis (not shown). The HDD can be arranged to connect to the bus 105 via a hard disk drive interface (not shown). The hard disk drive interface (not shown) can include a Universal Serial Bus (USB) (not shown) or an IEEE 1394 interface (not shown) for external applications.

The DB 120D can be configured to be accessed by any one or more of the components in the controller 70, including the processor 110. The DB 120D can be arranged to receive a query and, in response, retrieve specific data, data records or portions of data records based on the query. The DB 120D can be included in the HDD 120C, or provided separately, as shown in the embodiment depicted in FIG. 3. A data record can include, for example, a file or a log. The DB 120D can include a database management system (DBMS) that can interact with the processor 110. The DBMS can include, for example, SQL, NoSQL, MySQL, Oracle, Postgress, Access, or Unix. The DB can include a relational database.

The network interface 130 can connect to a network (not shown) or a computing device (not shown) and facilitate communication between the controller 70 and the computing device. The network interface 130 can include a wired or a wireless communication network interface (not shown) or a modem (not shown). When used in a local area network (LAN), the network interface 130 can connect to the LAN network through the wired or wireless communication network interface; and, when used in a wide area network (WAN), it can connect to the WAN network through the modem. The modem (not shown) can be internal or external and wired or wireless. The modem can be connected to the system bus 105 via, for example, a serial port interface (not shown). The network interface 130 can include a receiver (not shown), transmitter (not shown) or transceiver (not shown).

The input-output (IO) interface 140 can receive instructions or data from a computing device or an operator via a user interface (not shown), such as, for example, a keyboard (not shown), a mouse (not shown), a pointer (not shown), a stylus (not shown), a microphone (not shown), a speaker (not shown), or a display device (not shown). The received instructions and data can be forwarded from the IO interface 140 as signals via the bus 105 to any component in the controller 70, including the processor 110.

The driver suite 150 can include one or more actuator drivers (for example 1, 2, or N, where N is a positive integer greater than 2), each of which can be configured to drive a corresponding actuator—for example, actuators 20, 30, or 40 (shown in FIG. 1). In the embodiment of the apparatus 1 depicted in FIG. 1, the controller 70 can include actuator drivers 1, 2, and 3 to drive actuators 20, 30 and 40, respectively. Each actuator driver can be configured to interact with the TDCU 180 and, based on an actuator drive signal from the TDCU 180, communicate a voltage signal to its respective actuator to move the corresponding optical element (for example, 12, 14, or 16, shown in FIG. 1) to compensate for any thermal drift experienced by that optical element in real-time, for example, as the thermal drift occurs.

The temperature monitor 160 can be configured to communicate with the temperature sensor(s) 190. In other embodiments, the temperature sensor(s) can be located external to the apparatus 1, such as, for example, an avionics temperature sensor provided on an aerial vehicle (not shown) equipped with the apparatus 1. The temperature monitor 160 can be configured to interact with the temperature sensor(s) and continuously (or periodically) receive real-time temperature measurements for each optical element in the optical device 10 and communicate the temperature data to the TDCU 180.

The displacement monitor 170 can be configured to monitor and log the position of each optical element (for example, 12, 14, or 16) in real-time. In various embodiments, the displacement monitor 170 can be configured to communicate with an external beam calibrator 80 (for example, shown in FIGS. 4 and 6), such as, for example, an interferometer or autocollimator, and receive (or calculate) the real-time position of each adjustable optical element in the optical device 10.

Figure 4:
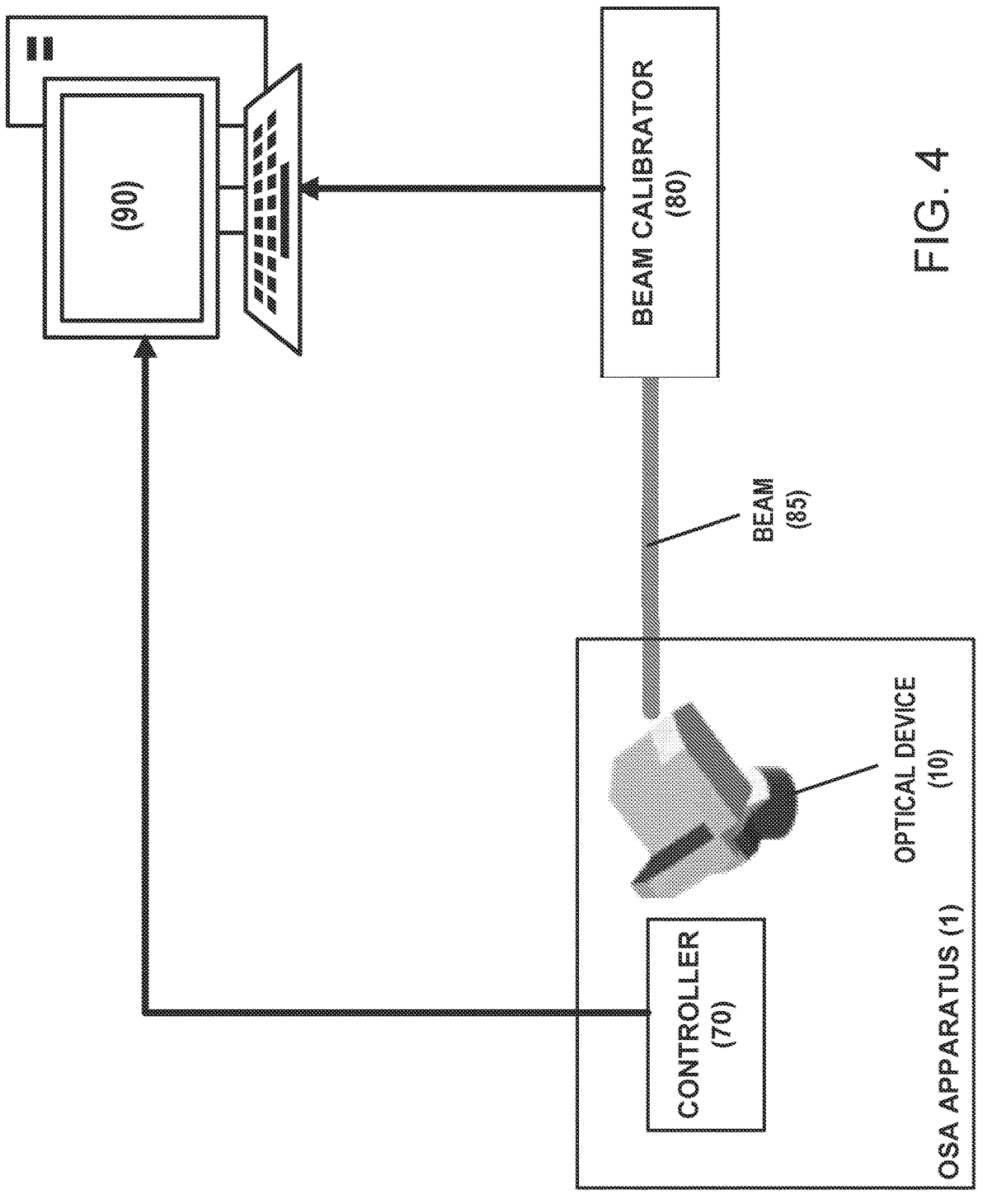
FIG. 4 shows an embodiment of an open-loop system comprising the OSA apparatus.

In the open-loop embodiment depicted in FIG. 4, the displacement monitor 170 can receive displacement data from the external beam calibrator 80 as it measures the alignment of each optical element (for example, 12, 14, or 16) as it changes with temperature in the optical device 10, while the temperature monitor 160 receives temperature data for the temperature sensor 190 on that same optical element. The temperature data can be communicated to the TDCU 180 by the temperature monitor 160 and the displacement data can be communicated by the displacement monitor 170 for each optical element that is configured for thermal-drift compensation in the optical device 10. The temperature and displacement data can be logged and stored as displacement versus temperature values in a multidimensional calibration table for each optical element 12, 14, 16.

The TDCU 180 can be configured to operate in an open-loop or closed-loop mode and calculate a correction displacement (for example, thermal drift vector comprising a magnitude of displacement and the direction of the displacement) for one or more of the optical elements (for example, 12, 14, or 16) in the optical device 10. The TDCU 180 can be configured to interact with the driver suite 150 and communicate an actuator drive signal comprising a voltage amount to the corresponding actuator driver to apply a voltage to the associated actuator (for example, 20, 30 or 40) to move (expand or contract) based on the correction displacement amount and direction and, thereby, the associated optical element to counteract any thermal drift in the optical element.

In the open-loop mode (for example, embodiment shown in FIG. 4), the TDCU 180 can reference the calibration table and, based on the measured temperature, calculate the correction displacement value for each adjustable optical element in the optical device 10. In various embodiments, the calibration table can include a displacement amount value and a direction value for the measured temperature on the optical element. The measured temperature can be received via the temperature monitor 160.

In the closed-loop mode (for example, embodiment shown in FIG. 6), the TDCU 180 can receive displacement data for each optical element and, based on the displacement data, calculate a correction displacement for each adjustable optical element in the optical device 10. The displacement data can be received via the displacement monitor 170. As noted above, the displacement data can include, in at least one embodiment, thermal drift vector data comprising a magnitude of displacement and the direction of the displacement. The TDCU 180 can interact with the driver suite 150 and communicate an actuator drive signal to the corresponding driver to apply a voltage to the actuator to move (expand or contract) based on the correction displacement and, thereby, the associated optical element to counteract any thermal drift.

In an embodiment, the TDCU 180 can comprise a machine learning platform that can be trained to monitor temperature, pressure, gravity, and vibration in the optical device 10 (shown in FIG. 1) and predict a correction amount for each of the optical elements in the device 10 (for example, optical elements 12, 14, 16) and maintain the optical elements in orthogonal alignment to each other at all times, while compensating for any thermal drift in real-time, as well any effects to alignment of the optical elements due to temperature, pressure, gravity, and vibration during operation. The TDCU 180 can be configured to continuously monitor and analyze real-time conditions (for example, temperature, pressure, gravity, and vibration amounts) and predict a thermal drift vector, including a magnitude and direction of movement, and for each optical element in the optical device, as well as a confidence score based on the level of certainty for the predicted value(s). The TDCU 180 can be configured to categorize the confidence score in any number of prediction certainty levels, including, for example, three levels—high, medium, or low—or, a prediction score having a value between 0 and 100, with 100 indicating certainty in the prediction and 0 indicating certainty that the predicted result will not occur. The TDCU 180 can be configured to identify an appropriate thermal drift vector for each optical element in the optical device based on the confidence score or prediction certainty level.

The TCU 180 can include one or more machine learning platforms, including one or more supervised machine learning platforms or one or more unsupervised machine learning platforms. The machine learning platform can include, for example, a deep neural network, a convolutional architecture for fast feature embedding (CAFFE), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for analyzing relationships amongst ambient conditions such as temperature, pressure, gravity and vibrations and predicting thermal drift vectors for each optical element in the optical device 10. The machine learning platform(s) can include a machine learning (ML) model that can analyze incoming real-time data (for example, temperature, pressure, gravity, and vibration) and predict a thermal drift vector for each optical element in the optical device 10.

The ML model can be arranged to receive temperature data from the temperature monitor 160, position data from the displacement monitor 170, pressure data from a pressure sensor (not shown), gravitational force data from a gravity sensor (not shown), and vibration data from a vibration sensor (not shown) and predict a thermal drift vector for each optical element based on an analysis of the received data. In an embodiment, an accelerometer (not shown) can be used to detect both gravitational forces and vibration.

The ML model can be built and trained using annotated historical data, including a training dataset stored in the storage 120. The ML model can be tuned using a testing dataset, which can also be stored in the storage 120. The TDCU 180 can tune the ML model during operation of the optical device 10 by updating parametric values in the ML model based on, for example, feedback regarding proper alignment of each of the optical elements after applying predicted thermal drift vectors via the actuators 20, 30, 40 to the corresponding optical elements 12, 14, 16, respectively.

FIG. 4 shows an embodiment of an open-loop system comprising the OSA apparatus 1. The open-loop system includes the apparatus 1, an external beam calibrator 80, and a computing device 90. In an alternative embodiment, the processor 110 (shown in FIG. 3) can handle the operations of the computing device 90, in which case the open-loop system need not include the computing device 90.

In the open-loop system embodiment (for example, shown in FIG. 4), the controller 70 can operate in the open loop mode, where the corrections are applied based on an internal calibration table that holds the correction displacement versus measured temperature. This data can be collected by monitoring the alignment accuracy of each optical element (for example, 12, 14, or 16) via the external beam calibrator 80. In various embodiments, the external beam calibrator 80 can include, for example, an interferometer or an autocollimator.

During the calibration process, the optical elements can be aligned electronically to be as close as possible to zero error at room temperature. The temperature of the apparatus 1, including the controller 70, can be slowly varied between the minimum and maximum extremes, for example, inside a thermal chamber (not shown), while the beam calibrator 80 monitors the optical alignment of the optical element from outside the chamber. The external beam calibrator 80 can be configured to measure the alignment of each optical element as it changes with temperature, while the controller 70, which can be fitted to the assembly in the apparatus 1, measures the temperature on each optical element. The optical alignment, including displacement, and the temperature values can be recorded for a plurality of data points by the computing device 90 (or, alternatively, the controller 70) and used to build the calibration table. The calibration table data can then be permanently programmed into the controller 70 and stored, for example, in the ROM 120B.

Figure 5:
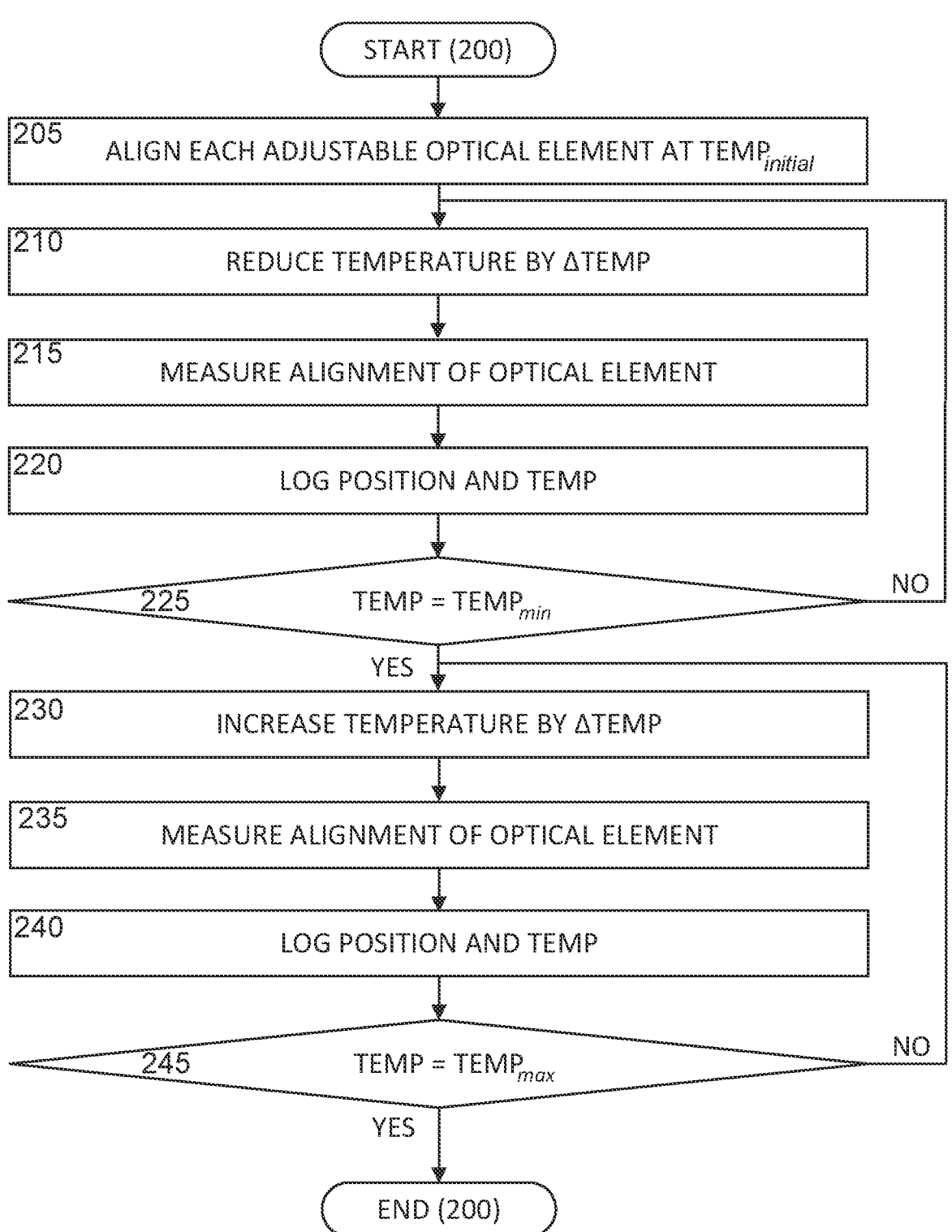
FIG. 5 shows a calibration process for the OSA apparatus in an open-loop system.

FIG. 5 shows an embodiment of a calibration process 200 that can be implemented with the apparatus 1 in an open-loop system (for example, shown in FIG. 4). In the calibration process 200, the controller 70 can operate in an open mode. The calibration process 200 can be implemented to build the internal calibration table that holds the correction displacement—versus—temperature data for each of the optical elements (for example, 12, 14 or 16) in the optical device 10. The calibration process 200 can be implemented to collect data and build the calibration table by monitoring the alignment accuracy of each optical element in the optical device 10.

In an embodiment, the calibration data can include a multidimensional table that holds correction displacement—versus—measured temperature and pressure, gravity, and/or vibration. The displacement data can include a displacement magnitude value and a direction value(s) representative of the amount and direction of thermal drift of the optical element for a given temperature.

In an embodiment, the apparatus 1, including the controller 70 and the optical device 10, can be placed in a thermal chamber (not shown) before beginning the process 200. The temperature of the apparatus 1 can be slowly varied between the minimum operational temperature ($TEMP_{min}$) and the maximum operational temperature ($TEMP_{max}$) inside the thermal chamber while the beam calibrator 80 monitors the optical element alignment from outside the chamber. The external beam calibrator 80 measures the alignment of each optical element as it changes with temperature, while the controller 70 measures the temperature on each optical element, and these values are logged and recorded.

Referring to FIGS. 1, 3 and 5 contemporaneously, each of the optical elements (for example, 12, 14, 16) in the optical device 10 can be aligned electronically to be as close as possible to zero error at an initial temperature $TEMP_{initial}$ (Step 205). The initial temperature in the thermal chamber can be room temperature (for example, $TEMP_{initial}=68$ degrees F.). The temperature in the thermal chamber can then be reduced by a discrete temperature amount $\Delta TEMP$ (Step 210), which can be, for example, one degree F. ($\Delta TEMP=1°$ F.). In various embodiments, the discrete temperature amount $\Delta TEMP$ can be less than, or more than one degree F. The accuracy of the alignment of each optical element can be monitored and measured from outside the thermal chamber by the external beam calibrator 80 (Step 215) and the position of the optical element and the associated temperature can be logged for each optical element and populated into the calibration table as displacement vs measured temperature for each optical element (Step 220). The temperature on each optical element can be measured and monitored by the controller 70. Steps 210, 215, and 220 can be repeated (NO at Step 225) until the temperature in the thermal chamber reaches $TEMP_{min}$ (Step 225).

Once minimum temperature ($TEMP_{min}$) is reached in the thermal chamber (YES at Step 225), the temperature can be increased by the discrete temperature amount $\Delta TEMP$, or a different discrete temperature value (Step 230). In an alternative embodiment, the thermal chamber can be returned to the initial temperature $TEMP_{initial}$ before taking any measurements. The accuracy of the alignment of each optical element can be measured by the external beam calibrator 80 (Step 235) and the position of the optical element and the associated temperature can be logged for each optical element and populated as displacement vs measured temperature data into the calibration table for each optical element (Step 240). Steps 230, 235, and 240 can be repeated (NO at Step 245) until the temperature in the thermal chamber reaches $TEMP_{max}$ (Step 240). After the thermal chamber reaches $TEMP_{max}$ (YES at Step 245), the process 200 can end.

In an embodiment, the thermal chamber can be cooled from $TEMP_{max}$ back to the initial temperature $TEMP_{initial}$ according to Steps 210, 215, 220 and displacement vs measured temperature data populated into the calibration table until the thermal chamber reaches initial temperature, after which the process 200 can end.

Figure 6:
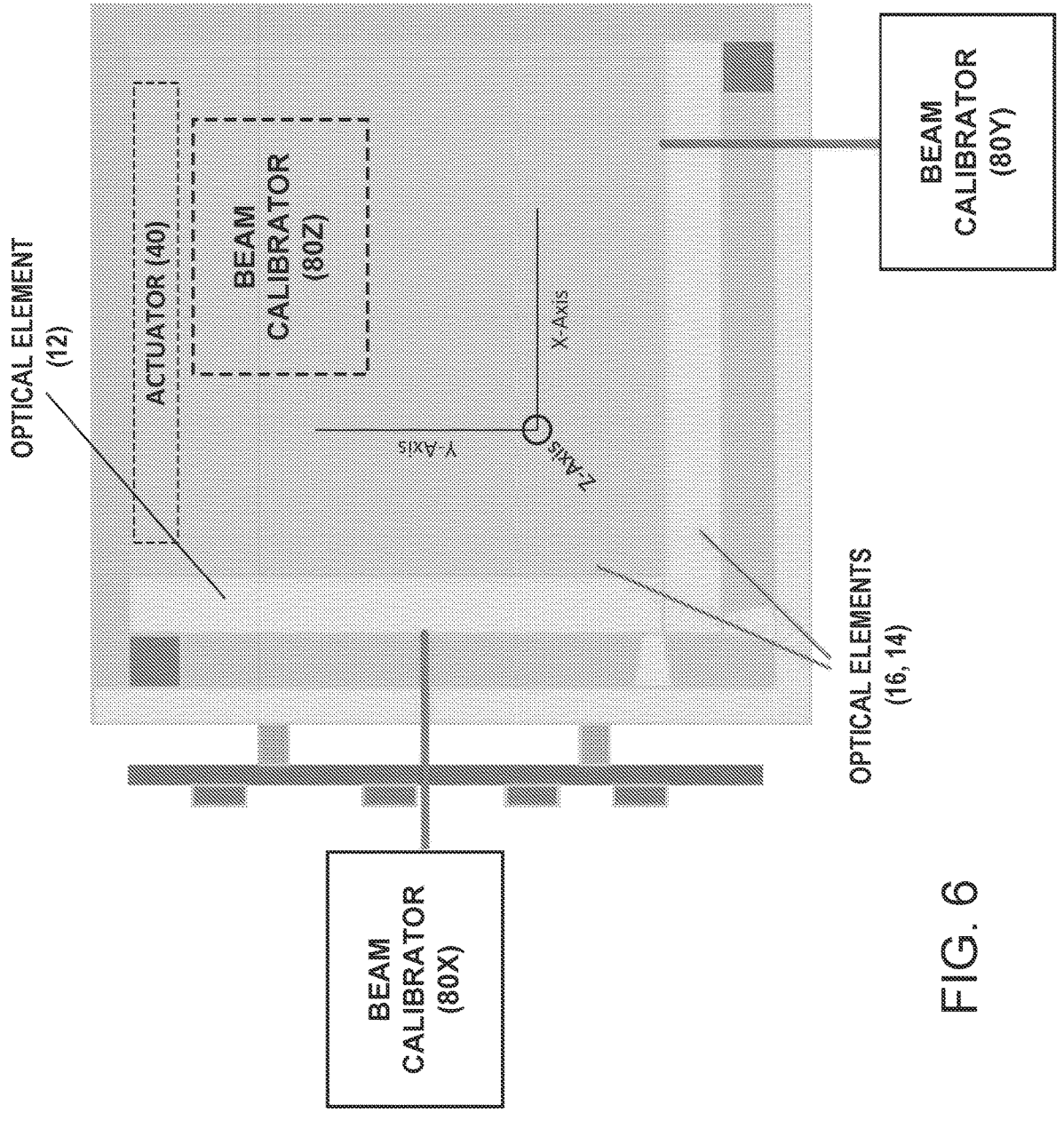
FIG. 6 shows an embodiment of a closed-loop system comprising the OSA apparatus.

FIG. 6 shows an embodiment of a closed-loop system comprising the OSA apparatus 1. The closed-loop system includes the apparatus 1 and a beam calibrator 80. In an embodiment, the beam calibrator 80 can include, for example, a single interferometer or autocollimator, in which case the single interferometer can detect the overall path length change between a beam hitting the front faces of all three optical elements 12, 14, 16, to monitor tilt and displacement of each optical element by looking at the rear of the optical elements. In the embodiment depicted in FIG. 6, the beam calibrator 80 includes three interferometers 80X, 80Y, and 80Z (80Z is shown in broken lines, as it is hidden behind the optical element 16), each of which can be aligned with a respective optical element 12, 14, 16, and configured to independently monitor tilt and displacement of each respective optical element by looking at the rears of the optical elements.

FIG. 7 shows a calibration process 300 for the OSA apparatus 1 in the closed-loop system, in which the controller is configured to operate in the closed-loop mode. Initially, before the calibration process 300 begins, the optical device 10 can be aligned and calibrated to be as close as possible to zero error at the initial temperature $TEMP_{initial}$, with the optical elements 12, 14, 16 being orthogonal to each other in the optical device 10. After the process 300 starts, the overall beam path is measured by the beam calibrator 80 and the measurement data sent to the displacement monitor 170 (Step 310). The displacement monitor 170 can be configured to monitor and analyze the measurement data (Step 320). If a change in the overall beam path is detected by the displacement monitor 170 to be greater than a predetermined displacement threshold (YES at Step 320), then the displacement data can be sent to the TDCU 180, which in turn can generate a displacement correction signal based on the change in overall beam path (Step 330), otherwise (NO at Step 320) the beam calibrator 80 can continue to measure overall beam path length and send measurement data to the displacement monitor 170 (Step 310). In an embodiment, the displacement threshold can be set to zero, or another acceptable near-zero value, such as, for example, less than 60 nanometers (nm), or less than 0.25 arcsec for a 50 mm length mirror. The TDCU 180, or, alternatively, the driver suite 150, can convert the displacement correction signal to a voltage signal (Step 340), which can then be applied to one or more of the actuators 20, 30, 40 to move the optical elements 12, 14, 16, respectively to correct the displacement(s) (Step 350), after which a determination can be made whether to end the process 300 (Step 360), such as, for example, during a power-down of the optical apparatus 1.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus that corrects for thermal drift in one or more optical elements in an optical device and maintains high precision accuracy of the optical device during extreme temperature changes, the apparats comprising:

an optical device having an optical element configured to direct or reflect a light beam;

a pivot support configured to hold a portion of the optical element and facilitate motion of the optical element in multidimensional space;

a controller configured to determine a displacement of the optical element due to thermal drift and generate an actuator drive signal based on the amount of the displacement; and an actuator configured to receive the actuator drive signal and counteract the thermal drift by moving, in cooperation with the pivot support and in response to the actuator drive signal, the optical element by an inverse amount and direction of the displacement of the optical element, wherein the optical element comprises a mirror panel and the optical device comprises at least one of a lateral transfer hollow retroreflector (LTHR), a lateral transfer hollow periscope (LTHP), one or more mirror panels, or a retroreflector having three mirror panels, including said optical element, with each mirror panel being separated from each other mirror panel to avoid crosstalk under changing temperatures.

2. The apparatus in claim 1, further comprising:

a beam calibrator configured to detect the displacement of the optical element due to thermal drift and generate a beam displacement signal representative of an amount of the displacement of the optical element due to thermal drift.

3. The apparatus in claim 2, wherein the controller is configured to:

receive the beam displacement signal from the beam calibrator; and determine the displacement of the optical element based on the beam displacement signal.

4. The apparatus in claim 2, wherein the optical device comprises a retroreflector having three mirror panels, including said optical element, and the beam calibrator detects the displacement of the optical element due to thermal drift by measuring an overall optical path length change between a beam hitting front faces of all three mirror panels.

5. The apparatus in claim 2, wherein the optical device comprises a retroreflector having three mirror panels, including said optical element, and the beam calibrator comprises three interferometers, each configured to detect a tilt or a displacement of one of the three mirror panels.

6. The apparatus in claim 1, further comprising:

a calibration table having displacement versus temperature data for the optical element, wherein the controller determines the displacement of the optical element due to thermal drift by referencing the calibration table and determining the displacement of the optical element based on a measured temperature.

7. The apparatus in claim 1, further comprising a temperature sensor that measures a temperature on the optical element.

8. The apparatus in claim 1, wherein the actuator comprises a thermoelectric actuator or an electro-mechanical actuator.

9. The apparatus in claim 8, wherein the electro-mechanical actuator comprises a piezo actuator having a piezo stack of piezo layers.

10. The apparatus in claim 8, wherein the electro-mechanical actuator is preloaded to a compression state that allows for bidirectional operation, including expansion or contraction based on an applied voltage.

11. A computer-implemented method that, when executed by one or more processors, corrects for thermal drift in one or more optical elements in an optical device and maintains high precision accuracy of the optical device during extreme temperature variations, the method comprising:

receiving a light beam from an optical element in an optical device;

determining a displacement of the optical element due to thermal drift;

generating an actuator drive signal based on the amount of the displacement of the optical element due to thermal drift; and operating an actuator based on the actuator drive signal to counteract and move, in cooperation with a pivot support, the optical element by an inverse amount and direction of the displacement of the optical element, wherein the method further comprises:

detecting the displacement of the optical element due to thermal drift by measuring an optical beam path change of the light beam from the optical element; and generating a beam displacement signal representative of an amount of the displacement of the optical element due to thermal drift.

12. The computer-implemented method in claim 11, wherein the determining the displacement of the optical element due to thermal drift is based on the beam displacement signal.

13. The computer-implemented method in claim 11, wherein the determining the displacement of the optical element due to thermal drift comprises:

referencing displacement versus temperature values in a calibration table for the optical element; and, determining a displacement value based on a measured temperature.

14. The computer-implemented method in claim 11, wherein the optical device comprises a retroreflector having three mirror panels, including said optical element, and the measuring the optical beam path change of the light beam from the optical element comprises measuring an overall optical path length change between a beam hitting front faces of all three mirror panels.

15. The computer-implemented method in claim 11, wherein the optical device comprises a retroreflector having three mirror panels, including said optical element, and the measuring the optical beam path change of the light beam from the optical element comprises measuring an optical path length at each of the three mirror panels by a respective beam calibrator configured to detect a tilt or a displacement of the mirror panel.

16. The computer-implemented method in claim 11, wherein the actuator comprises an electro-mechanical actuator having a piezo stack of piezo layers.

17. The computer-implemented method in claim 16, wherein the electro-mechanical actuator is preloaded to a compression state that allows for bidirectional operation, including expansion or contraction based on an applied voltage.

18. A non-transitory computer readable medium containing computer instruction or computer code that, when executed by one or more processors, cause an apparatus to perform operations to correct for thermal drift in one or more optical elements in an optical device and maintain high precision accuracy of the optical device during extreme temperature variations, including operations comprising:

receiving a light beam from an optical element in an optical device;

determining a displacement of the optical element due to thermal drift;

generating an actuator drive signal based on the amount of the displacement of the optical element due to thermal drift; and operating an actuator based on the actuator drive signal to counteract and move, in cooperation with a pivot support, the optical element by an inverse amount and direction of the displacement of the optical element, wherein the operations further comprise:

detecting the displacement of the optical element due to thermal drift by measuring an optical beam path change of the light beam from the optical element; and generating a beam displacement signal representative of an amount of the displacement of the optical element due to thermal drift.

19. The non-transitory computer readable medium of claim 18, wherein the determining the displacement of the optical element due to thermal drift is based on the beam displacement signal.

20. The non-transitory computer readable medium of claim 19, wherein the determining the displacement of the optical element due to thermal drift comprises:

referencing displacement versus temperature values in a calibration table for the optical element; and, determining a displacement value based on a measured temperature.

* * * * *